US006765597B2

(12) United States Patent
Barksdale et al.

(10) Patent No.: US 6,765,597 B2
(45) Date of Patent: Jul. 20, 2004

(54) SYSTEM AND METHOD FOR USING LAYER BARS TO INDICATE LEVELS WITHIN NON-INDENTED TREE VIEW CONTROL

(75) Inventors: Molly Kestner Barksdale, Austin, TX (US); Bethany Lyn Kessen, Apex, NC (US); Martin Thomas Moore, San Francisco, CA (US); Gerald Ray Woods, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 09/838,602

(22) Filed: Apr. 19, 2001

(65) Prior Publication Data

US 2002/0154177 A1 Oct. 24, 2002

(51) Int. Cl.[7] .................................................. G09G 5/00
(52) U.S. Cl. ....................................... 345/853; 345/854
(58) Field of Search ................................ 345/853, 854, 345/855, 746, 767

(56) References Cited

U.S. PATENT DOCUMENTS

| | | | | |
|---|---|---|---|---|
| 4,868,743 | A | | 9/1989 | Nishio .......................... 364/200 |
| 5,485,175 | A | * | 1/1996 | Suzuki ......................... 345/841 |
| 5,493,682 | A | | 2/1996 | Tyra et al. ................... 395/700 |
| 5,644,736 | A | | 7/1997 | Healy et al. ................. 395/341 |
| 5,649,192 | A | | 7/1997 | Stucky ......................... 395/614 |
| 5,751,287 | A | | 5/1998 | Hahn et al. .................. 345/351 |
| 5,987,469 | A | | 11/1999 | Lewis et al. ................. 707/102 |
| 6,115,549 | A | | 9/2000 | Janis et al. .................. 395/712 |
| 6,236,400 | B1 | * | 5/2001 | Guerrero ..................... 345/841 |
| 6,252,597 | B1 | * | 6/2001 | Lokuge ........................ 345/841 |

FOREIGN PATENT DOCUMENTS

| | | | | |
|---|---|---|---|---|
| WO | WO 96/38951 | | 12/1996 | ........... H04L/12/24 |
| WO | WO 97/29421 | | 8/1997 | ............. G06F/9/44 |

OTHER PUBLICATIONS

Microsoft Windows Explorer 2000 Screen Dumps (page 1, 1999).*

"Efficient 3D Method for Displaying Browser Uniform Resource Locator Bookmarks," *IBM Technical Disclosure Bulletin*, vol. 41, No. 1, Jan. 1998, p. 523–525.

Myers et al., "Reusable Hierarchical Command Objects," *Human Factors in Comp. Sys. Proceedings*, Apr. 14–18, 1996.

Sun et al., "Dynamic Maintenance of Multidimensional Range Data Partitioning for Parallel Data Processing," ACM Digital Library, 1999, p. 72–79.

* cited by examiner

*Primary Examiner*—Kristine Kincaid
*Assistant Examiner*—Jordan Golinkoff
(74) *Attorney, Agent, or Firm*—Gerald R. Woods; Joseph T. VanLeeuwen (57) ABSTRACT

A system and method for displaying layered data, such as data with a hierarchical relationship is provided. A flat tree view control is provided that indicates the level corresponding to individual data items without indenting data items. Layer bars, or markers, are used to indicate the level of the individual data items within the data hierarchy. In addition, color or grayscale shading can be applied to each data item to further indicate the item's level within the hierarchy. Items within the same level use the same color or shading. When an item is selected by the user it is expanded or collapsed depending on whether the layers below the selected item already appear on the display screen. Additional level indicator values can be used to further indicate the level of data items. A data item can also be highlighted to indicate a particular attribute corresponding with an individual data item.

18 Claims, 9 Drawing Sheets

SYSTEM AND METHOD FOR USING LAYER BARS TO INDICATE LEVELS WITHIN NON-INDENTED TREE VIEW CONTROL

RELATED APPLICATION

This application is related to the following copending U.S. Patent Application filed on the same day as the present application: "System and Method for Using Shading Layers and Highlighting to Navigate a Tree View Display,", each with the same inventors and each assigned to the IBM Corporation.

BACKGROUND OF THE INVENTION

1. Technical Field

The present invention relates in general to a method and system for using color and highlighting to display a tree view display. More particularly, the present invention relates to a system and method for providing a non-indented, layered representation of tree view data.

2. Description of the Related Art

Computer systems in general and International Business Machines (IBM) compatible personal computer systems in particular have attained widespread use for providing computer power to many segments of today's modern society. Systems with microprocessors are finding themselves in an array of smaller and more specialized objects that previously were largely untouched by computer technology. These devices are sometimes called "pervasive computing systems" because of their appearance as both traditionally computerized devices, such as desktop computers, tower computers, and portable computers, as well as newly computerized devices such as telephones, appliances, automobiles, and other devices. Pervasive computing devices generally include a system processor and associated volatile and non-volatile memory, a display area, input means, and often interfaces, such as a network interface or modem, to other computing devices.

One of the distinguishing characteristics of these systems is the use of a system board to electrically connect these components together. Pervasive computing devices are "information handling systems" which are designed primarily to give independent computing power to a single user, or a group of users in the case of networked computing devices. Pervasive computing devices are often inexpensively priced for purchase by individuals or businesses. A pervasive computing device may also include one or more I/O devices (i.e. peripheral devices) which are coupled to the system processor and which perform specialized functions. Examples of I/O devices include modems, sound and video devices or specialized communication devices. Nonvolatile storage devices such as hard disks, CD-ROM drives and magneto-optical drives are also considered to be peripheral devices. Pervasive computing devices are often linked to computing systems and other pervasive computing devices using a network, such as a local area network (LAN), wide area network (WAN), or other type of network such as the Internet. By linking to computers including pervasive computing devices, a pervasive computing device can use resources owned by another computing device. These resources can include files stored on nonvolatile storage devices and resources such as printers.

Pervasive computing devices are often designed to perform a specialized function that has native applications related to the function being performed. For example, a cellular telephone may be a pervasive computing device and may have a telephone directory as a native application. The telephone directory application can store names and phone numbers the user of the cellular phone wishes to store for easy retrieval. Because pervasive computing devices are often portable devices, such as a "personal digital assistant" ("PDA") or mobile telephones. As a portable device, or as a device incorporated within a larger appliance, pervasive computing devices may have constrained displays in terms of both resolution and screen size. One challenge in using devices with constrained screens is being able to navigate through layered information.

Figure 1A:
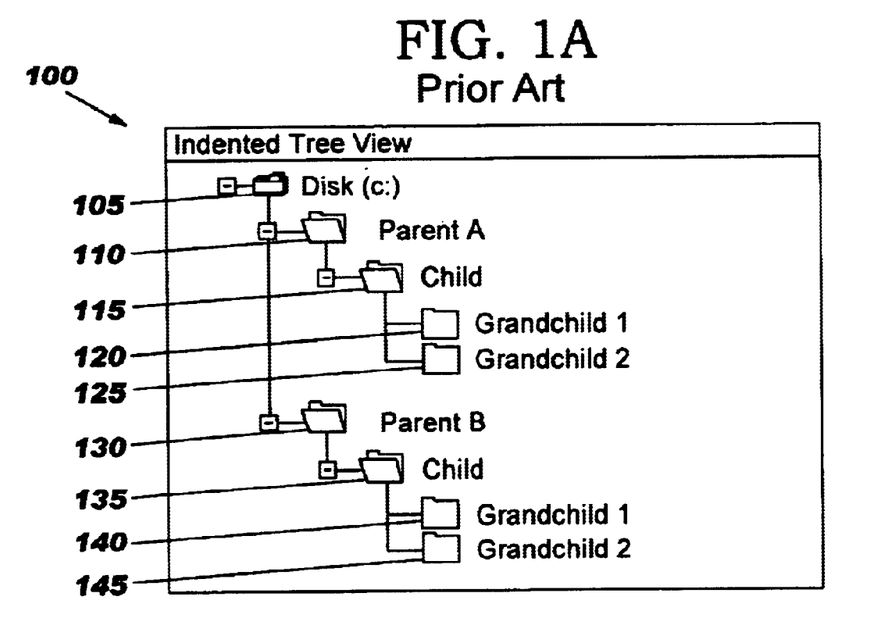
FIG. 1a is a prior art depiction of a tree view control.

One way in which layered, or hierarchical, information is presented is by using a "tree view" control to display the information to the user. A tree view control is a window that displays a hierarchical list of items, such as the headings in a document, the entries in an index, or the files and directories on a disk. Items displayed often include a label and an optional bitmapped image, and each item can have a list of subitems associated with it. By clicking an item, the user can expand or collapse the associated list of subitems. FIG. 1a shows a traditional tree view control including how items and subitems are displayed in relation to one another.

Traditional tree view window 100 shows example directories stored on a disk. Disk item 105, also called the "root directory," includes a bitmap representing a drive and a label ("Disk (c:)") corresponding to the disk. Two high level directories, directory 110 ("Parent A") and directory 130 ("Parent B") are shown within the root directory. The hierarchical structure of the information is depicted by showing the directories under the root directory and indented horizontally from the horizontal position of the root directory. Likewise, subdirectories of the two high level directories are shown under the respective high level directory and further indented horizontally from the horizontal position of the parent directory. For example, child directory 115 is shown below parent directory 110 as well as indented horizontally from the horizontal starting position of parent directory 110. Similarly, child directory 135 is shown below parent directory 130 as well as indented horizontally from the horizontal starting position of parent directory 130. Because any item can include subitems, the level of data shown, and the corresponding visual depth shown in the vertical and horizontal displacement, is virtually limitless.

As shown, child directory 115 has two subdirectories (grandchild directories 120 and 125) and child directory 135 has two subdirectories (grandchild directories 140 and 145). The grandchild directories, and their respective subdirectories, can have further subdirectories until all the data needed to be displayed is shown. If the horizontal displacement of a subitem is outside the window area (tree view window 100), a horizontal scroll bar is often placed on the bottom of the window to allow the user to scroll the display to show higher level items on the left side of the window or lower level windows on the right side of the window. Scrolling between high and low level information is challenging to the user because the visual relationship between data items is weakened when only high or low level information can be seen at a given time.

This challenge is exacerbated when the resources of the pervasive computing device are constrained. For example, because of the small form factor the display is often smaller than in monitors attached to traditional desktop systems. This constraint may prevent the pervasive computing device from displaying more than one or two layers in a traditional tree view control.

What is needed, therefore, is a way to display hierarchical relationships between items in a flat tree without needing to provide horizontal displacements to communicate the level of a particular item and its relationship with other items being displayed.

SUMMARY

It has been discovered that hierarchical relationships and layered data can be represented without using differing degrees of indentations for the names of data items at different levels in the hierarchy. The displayed names of data items appear in a flat or non-indented list. The level of each data item is indicated by a bar or marker which creates a conspicuous visual discontinuity in the space occupied by the data item name. The relative horizontal displacements of the visual discontinuities are indicative of the relative levels of the data items. In one embodiment, the discontinuity is provided by applying shading in an offset manner on a flat tree control structure. A level indicator, such as a bar or marker, is used to identify the item's level. If intense colors are desired for the bar or marker, the data item name is superimposed on the bar or marker which acts as a background fill. If translucent colors are acceptable, the bar or marker may be superimposed on the data item name. Color and grayscale changes can be provided to further denote the level of a particular item. The horizontally displaced bars or markers enables a user to identify the layered relationships between tree view nodes even if the shading or colors between nodes is difficult to ascertain because of display limitations or the user's visual limitations.

Highlighting, such as color or grayscale fill, can also be used to visually identify items with a particular layer while virtual displacement is used to show which subitems belong to a higher level item. For example, the highest level items may be shown with a first fill color (e.g., yellow), the next, or second, level items are shown with a second fill color (e.g., orange), third level items are in turn shown with a third fill color (e.g., light blue), and fourth level items are shown with a fourth fill color (e.g., dark blue). If color is not supported on the display, shades of gray can be used instead.

When visually using the flat tree control, levels can be identified by color. In the example described above, if the user sees a yellow filled item, he knows that the item is a high level item. If all the items shown are the same color then the user knows that he is looking at one layer of data. If the fill color from one item to the next changes, for example from yellow to orange, the user understands that a level change is being shown. In the example described above, the orange item would be a subitem of the yellow item.

By using color or grayscale changes to denote levels, groups of data are identified without using horizontal displacement of item names. In addition, numeric level indicators can be provided to further note the various levels. The numeric level indicators may be well suited to environments in which the display resolution is poor or variations in shading or color is difficult to determine because of a user's visual limitations or other considerations.

Further highlighting is used to indicate attributes of a particular layer. For example, a particular fill color or shading intensity can be used to denote the layer to which an item belongs, while a color can be added to note another attribute, such as whether an error has been found in the item, new information is located in the item, or to identify the importance of a particular item in relation to the other items within the same layer. The highlighting can be added so that the fill, or background, color identifies an items layer with highlighting being added to the text characters comprising the item's label. Other highlighting, such as blinking, inverted text, bold text, and underlining can be used instead, or in addition to, changing an item's label color.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1B:
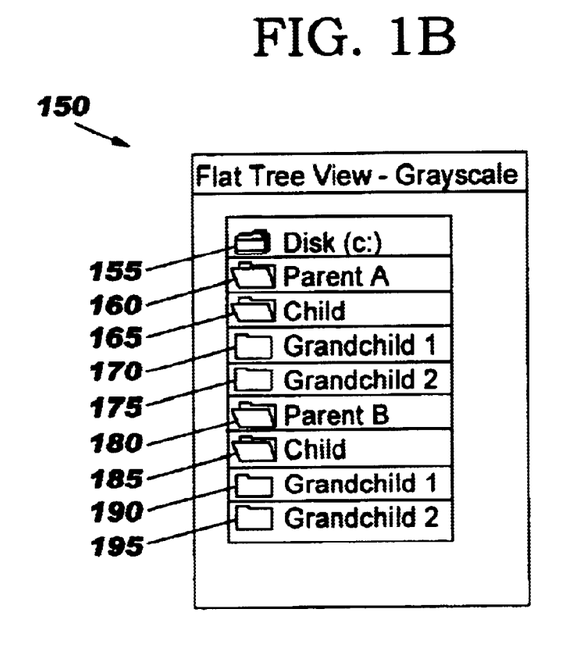
FIG. 1b is an example of a flat tree control using grayscale fill to denote level changes.

FIG. 1a shows a prior art tree view control that uses horizontal item displacement to denote layers and relationship with other items (see the background discussion for a more detailed discussion of FIG. 1b). FIG. 1b, in comparison, shows a flat tree view display of the same data displayed in FIG. 1a. Flat tree view window 150 is noticeably narrower than indented tree view window 100 yet displays the same information regarding item layers and relationships. Comparing the placement of items depicted in FIG. 1a with the placement of the same items in FIG. 1b further illustrates the flat structure of the flat tree view control shown in FIG. 1b. High level directory 155 ("Disk (c:)"), also called the root directory for the c: hard drive, is lightly shaded and includes a disk icon accompanying the label text. The next level data, directories 160 and 180 ("Parent A" and "Parent B," respectively) are shaded slightly darker than the previous layer (directory 155), indicating that directories 160 and 180 are subdirectories, or subitems, of directory 155. Likewise child directories 165 and 185 are slightly darker than their respective parent directories 160 and 180. Finally, grandchild directories 170, 175, 190, and 195 are the darkest shaded items shown, indicating that they are the lowest level directories being displayed.

Figure 2:
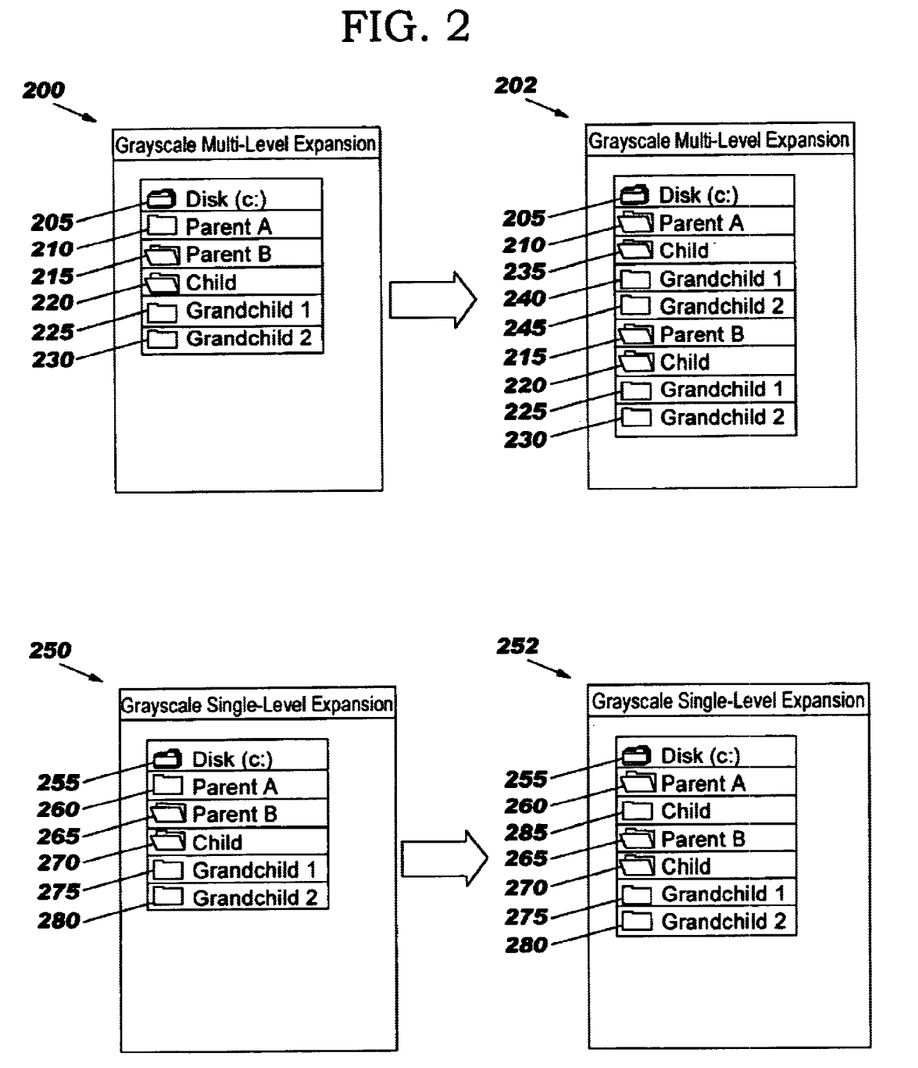
FIG. 2 is a sequence diagram showing a user expanding a grayscale flat tree control by selecting various items.

FIG. 2 shows a sequence diagram of a user expanding a grayscale flat tree control by selecting various items. Window 200 shows a flat tree view control with multi-level expansion. Multi-level expansion allows the user to click on a high level item whereupon all the item's subitems are automatically opened (including "grandchildren," "great-grandchildren," etc.). The user uses the keyboard or a selection device, such as a mouse, trackball, etc., to select an item he wishes to expand. In the example shown, the items shown in first screen 200 include root directory 205, parent A directory 210, parent B directory 215, child directory 220 (a subitem of parent B directory 215), and grandchild directories 225 and 230 (both of which are subitems of child directory 220). Icons can be used to inform the user as to whether a particular directory is opened. For example, parent B directory 215 has an open folder icon indicating that the subitems of the directory are already being displayed. In contrast, parent A directory 210 has a closed folder indicating that this directory has not been opened and, therefore, any subitems within this directory are not currently displayed in window 200. To see the contents of parent A directory 210, the user selects the directory using a pointing device or keyboard. When the user moves his pointing device, arrow 201 correspondingly moves on screen 200. In the example shown, the user has moved arrow 201 over parent A directory 210 and selected the item, for example by clicking a button located on a mouse or trackball. In a multi-level expanding application, all subitems under parent A directory 210 are shown after when the user selects parent A directory 210. Second screen 202 shows the result of the user selecting parent A directory 210. The icon shown with parent A directory 210 is changed from a closed folder icon to an open folder icon. Beneath parent A directory 210, subitems included with the directory are visible. Child directory 235 is shown. Because the application is a multi-level expanding application, the folders within child directory 235 are also shown. In this case, grandchild directories 240 and 245 are shown beneath child directory 235. In some multi-level expanding applications, a certain number of levels (e.g., up to 3 levels) are displayed when the user selects a higher level item. In some cases, the number of subitem levels that are opened is user selectable through a configuration or setup file.

Window 250 shows the same tree view control as shown in window 200. However, in the example shown in window 250, a single-level expansion is displayed (rather than the multi-level expansion shown in window 200 and 202). In the example shown, the items shown in first screen 250 include root directory 255, parent A directory 260, parent B directory 265, child directory 270 (a subitem of parent B directory 265), and grandchild directories 275 and 280 (both of which are subitems of child directory 270). When the user selects parent A directory 260 by moving arrow 250 over the item and selecting the item, second screen 252 results. Second screen 252 shows the addition of child directory 285 under parent A directory 260. Because windows 250 and 252 show a single-level expansion example, only the next level beneath parent A directory 260 is shown. Note that the icon corresponding to parent A directory 260 is now an open folder icon and the icon for the newly added child directory 285 is a closed folder icon. If the user selected child directory 285, the next level below child directory 285 would be displayed (such as grandchild directories 240 and 245 shown in window 202).

Figure 3:
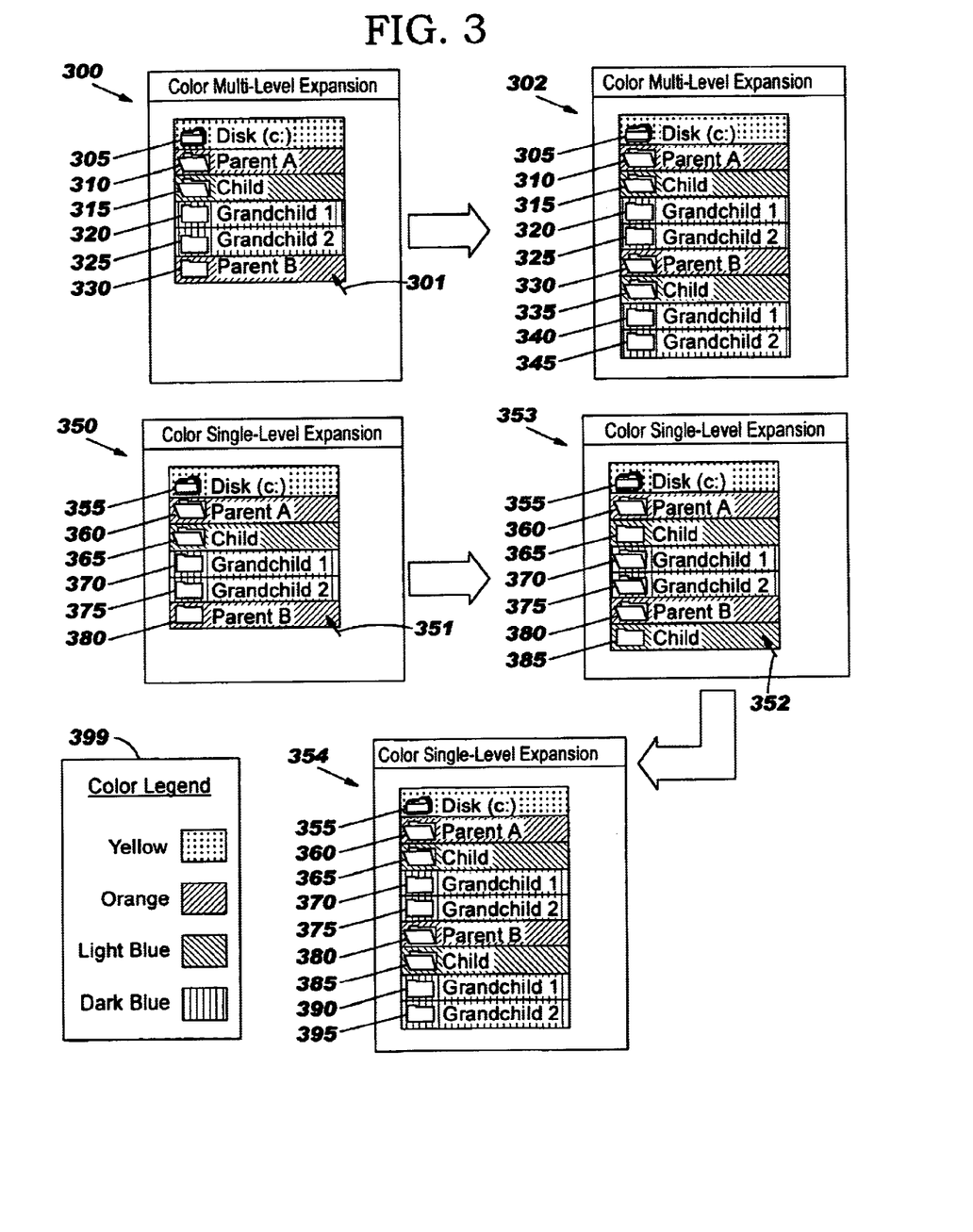
FIG. 3 is a sequence diagram showing a user expanding a color flat tree control by selecting various items.

FIG. 3 is a sequence diagram showing a user expanding a color flat tree control by selecting various items. Windows 300 and 302 show a multi-level expansion (similar to windows 200 and 202 in FIG. 2) whereas windows 350, 353, and 354 show a single-level expansion sequence (similar to windows 250 and 252 in FIG. 2). The items shown in FIG. 3 are similar to the items shown in FIG. 2, however the level indication for FIG. 3 utilizes color to indicate a particular items' level. Legend 399 shows the fill patterns and the corresponding colors they represent. In the example shown, the items shown in first screen 300 include root directory 305 which would have a yellow fill color, parent A directory 310 which would have an orange fill color, child directory 315 (a subitem of parent B directory 310) which would have a fill color of light blue, and grandchild directories 320 and 325 (both of which are subitems of child directory 315) which would have fill color of dark blue, and parent B directory 330 which would have an orange fill color. By looking at an item's color, the user quickly understands the hierarchy of the items, which items are subitems of other items, and which items are related. The yellow filled items are the highest level, followed by orange filled items, light blue filled items, and finally dark blue items. Of course, the color used for a particular layer can be most any color and in some implementations may be specified by the user. When the user selects parent B directory 330 using a pointing device corresponding to arrow 301, second screen 302 would be displayed. Similar to the multi-level expansion shown in FIG. 2, the multi-level expansion expands multiple levels beneath parent B directory 330. In this case, second screen 302 includes child directory 335, and grandchild directories 340 and 345.

In a single-level expansion, a single level is shown beneath a selected item when the item is selected. Window 350 shows the same items as presented in window 300. However, in this example a single level, rather than multiple levels, are shown when an unexpanded level is selected. Conversely, if a previously expanded item is selected, the levels underneath the selected item are removed from the screen and the selected item's icon changes from an opened folder to an unopened folder. In window 350, the same items appear as were in window 300 (root directory 355, parent A directory 360, child directory 365, grandchild directories 370 and 375, and parent B directory 380 correspond to respective directories 305 through 330 shown in window 300). However, when parent B directory 380 is selected using arrow 351, only one additional layer underneath the selected directory is shown. In this case, child directory 385 is shown in window 353. The icon corresponding to parent B directory 380 is now shown as opened and the icon corresponding to child directory 385 is shown as unopened. When child directory 385 is selected using arrow 352, an additional layer of items underneath directory 385 appear in window 354. In this case, two additional directories, grandchild directories 390 and 395, appear.

Figure 4A:
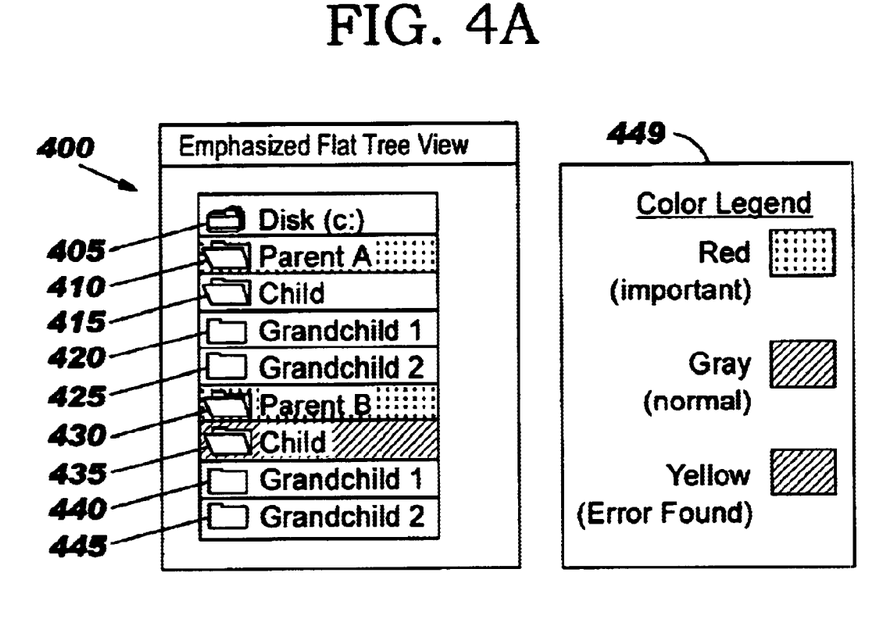
FIG. 4a is a diagram of a flat tree view control with additional highlighting to emphasize item attributes.

FIG. 4*a* is a diagram of a flat tree view control with additional highlighting to emphasize item attributes. Window 400 shows a flat tree view control with the same items as shown in window 202 in FIG. 2. Root directory 405 is lightly shaded, parent directories 410 and 430 are the next layer under the root directory layer and are therefore slightly darker than root directory 405. Each parent directory has a child directory, 415 and 435, respectively, which are again slightly darker than the parent directories. Each child directory includes two grandchild directories, 420 and 425 corresponding to child directory 415, and 440 and 445 corresponding to child directory 435, which are the most darkly shaded items shown in window 400. In this example, however, emphasis of particular items is shown along with the layer of the item. Color legend 449 shows the emphasis being used in the example. Grandchild directory 425 is colored red which indicates that the directory is important, while child directory 435 is yellow indicating that errors have been identified in the directory. Other emphasis highlights can be used to indicate other features or attributes of given items. In addition, while color is shown as a highlighting tool, many other highlighting tools can be used. For example, the text of the label (i.e., "Grandchild 2") can be emphasized using a color, underline, italics, or bold features. In addition, the icon can be modified to add a symbol or character indicating a condition. For instance, a red exclamation mark may indicate an important item, while a yellow question mark may indicate errors found within the particular item.

Figure 4B:
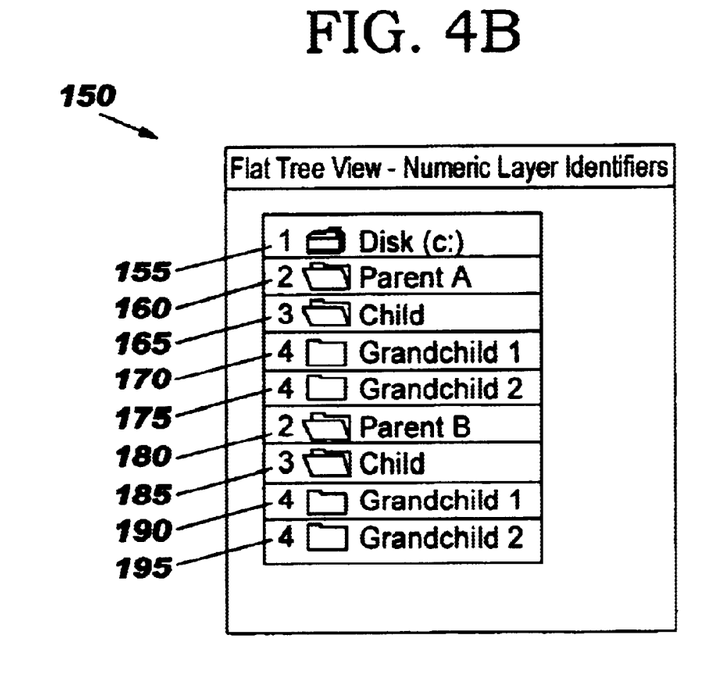
FIG. 4b is a diagram of a flat tree view control including numeric layer identifiers.

FIG. 4b is a diagram of a flat tree view control including numeric layer identifiers. Some displays on pervasive computing devices may have poor contrast or color controls or may be used in light conditions in which the display screen is difficult to view. Also, some users may have visual impairments or be otherwise unable to easily distinguish between shading or color values used to indicate an item's level in comparison with other items shown on the screen. In these cases, a numerical or alphabetical level indicator can be added to provide additional visual cues to the user. In the example shown, window 450 includes the same items presented in window 400. However, to the left of each item a numerical level indicator is displayed. Root directory 455 is shown as the first level, parent directories 460 and 480 are shown as being in the second level, child directories 465 and 485 are shown being in the third level, and grandchild directories 470, 475, 490, and 495 are shown being in the fourth level. While drive and folder icons are also shown for each level, these icons could be removed to save horizontal display space, or the numeric level indicator could be included, or overlaid, on the respective icons. While the example shown is a grayscale example, the level indicators would also work on colored flat tree view displays.

Figure 5:
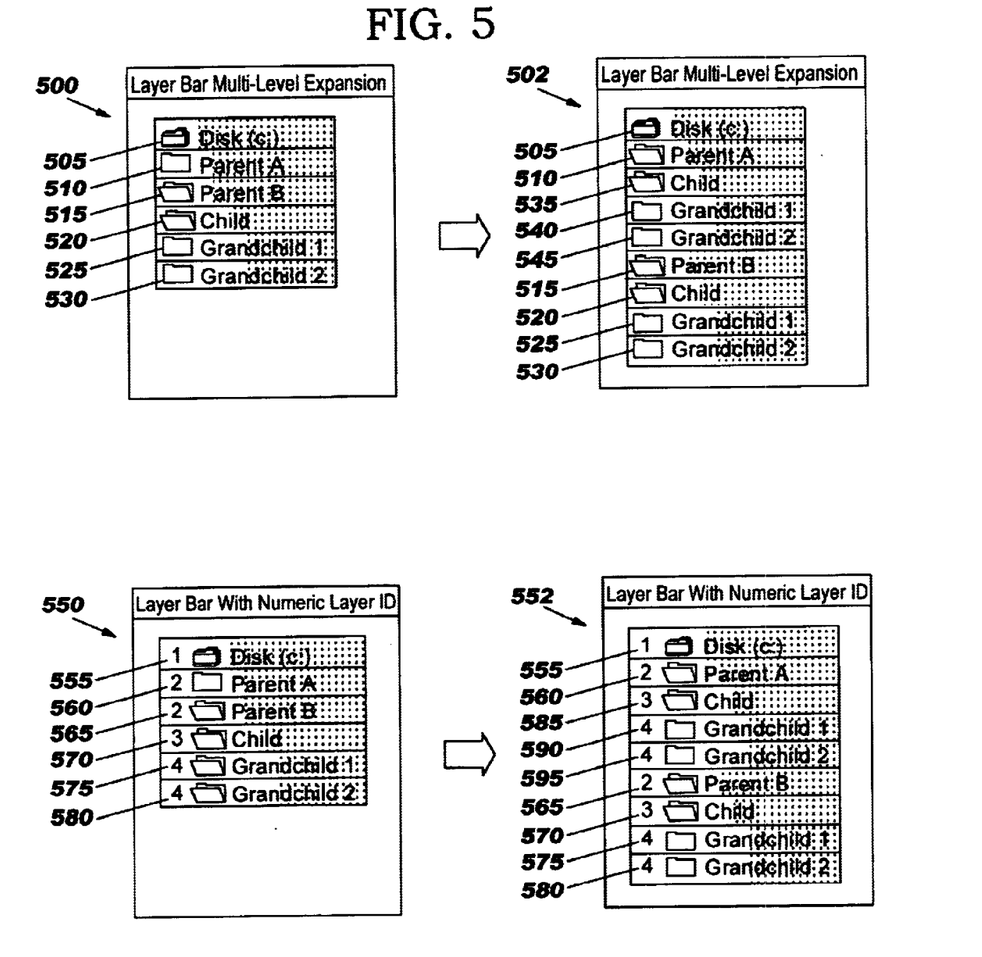
FIG. 5 is a sequence diagram of a flat tree view control using layer bars superimposed on tree view item to identify the hierarchical structure.

FIG. 5 is a sequence diagram of a flat tree view control using layer bars superimposed on tree view item to identify the hierarchical structure. In this example, a layer bar is displayed with an item to provide a horizontal displacement reference regarding the items' respective levels without shifting the displayed text. The items displayed in window 500 are the same as the items displayed in window 200 in FIG. 2. Root directory 505 has the longest overlay bar indicating that it is at the highest level of the hierarchy. Parent directories 510 and 515 are shown with overlay bars offset to the right from root directory 505 indicating that these directories are in the next layer of the hierarchy. Child directory 520 is shown with an overlay bar offset to the right from the parent directories indicating that this directory is in the next layer down from the parent directories. The overlay bars may be either overlaid on the text in such a fashion that the text is visible, or alternatively, the bars may be displayed as background fill with the text applied on top of the background fill. Finally, overlay bars included with grandchild directories 525 and 530 are offset from the overlay bar included with the child directory indicating that these directories are in an even lower layer of the hierarchy. When the user selects parent A directory 510 as shown by selection arrow 501, the items beneath the parent directory are displayed. Window 502 shows the resulting display with child directory 535 and grandchild directories 540 and 545 displayed with overlay bars corresponding to their respective levels. While the shading of the items shown is kept constant and the level is indicated using the offset bar, color or different level shading (as described in FIGS. 2–4) can be incorporated with the offset bar to provide additional visual cues to the user regarding the relationship between items and the hierarchy of the information.

Windows 550 and 552 show an analogous situation as shown in windows 500 and 502, except that in windows 550 and 552 numeric level indicators are included in addition to the item names and offset bars. Window 550 shows the flat tree view control before expansion while window 552 shows the control following expansion. Root directory 555 is shown with its offset bar and a numeric indicator showing that it is the first layer of the hierarchy. Parent directories 560 and 565 are shown with the similar offset bars and a numeric indicator showing that these directories are in the second layer of the hierarchy. Child directory 570 is shown with its offset bar and a numeric indicator that it is in the third layer of the hierarchy. Finally, grandchild directories 575 and 580 are shown with similar offset bars and numeric indicators that these directories are both in the fourth layer of the hierarchy.

When the user selects parent A directory 560 using selection arrow 551, the items beneath the parent directory are displayed, as shown in resulting display 552. Child directory 585 is shown underneath parent A directory 560. Child directory 585 includes an offset bar indicating that it is in the same level of the hierarchy as child directory 570 and has the same level indicator showing that it is in the third level of the hierarchy. Grandchild directories 590 and 595 are shown under child directory 585 with offset bars and level indicators showing that these directories are beneath child directory 585 in the hierarchy. Again, while the same shading is used for the offset bars, the bars can be colored or use different grayscales to further indicate the level and hierarchical relationships between items. Also, while a multi-level expansion is shown in FIG. 5, a single-level or other type of expansion could be used to display a single additional level or a fixed number of levels when an item is selected by the user. Furthermore, emphasis of a particular item within the tree view control can be added using the techniques described in FIG. 4.

Figure 6A:
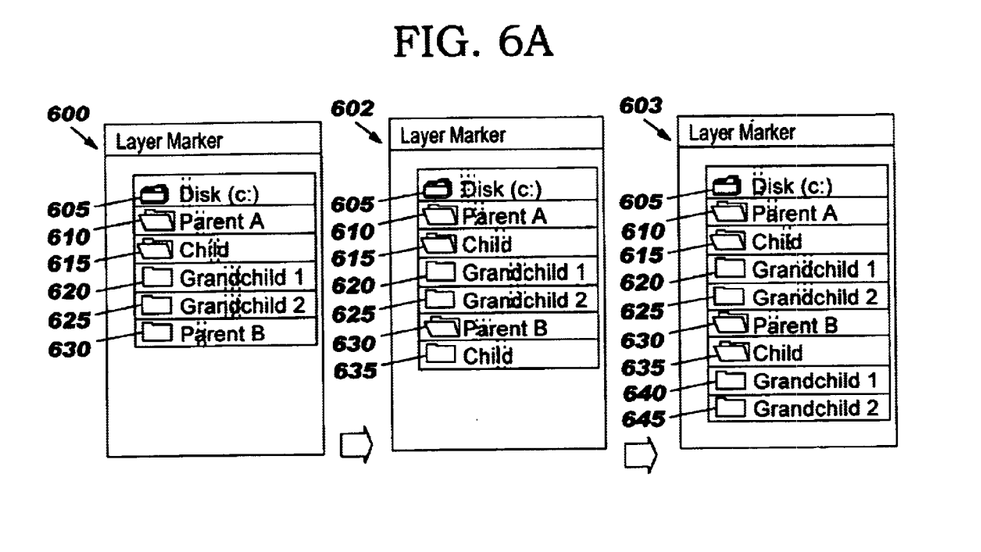
FIG. 6a is a sequence diagram of a flat tree view control using layer markers superimposed on tree view item to identify the hierarchical structure.

FIG. 6a is a sequence diagram of a flat tree view control using layer markers superimposed on tree view item to identify the hierarchical structure. The item information and sequencing shown in FIG. 6a is similar to the item information shown and sequencing shown in FIG. 3, windows 350, 353, and 354. In FIG. 6a, window 600 shows a partially expanded tree view control. Instead of horizontal bars to indicate an item's level, as shown in FIG. 5, FIG. 6a uses a level marker. Each marker is roughly the same size in terms of height and width with its offset used to indicate the item's level with the hierarchy. As with layer bars, markers may be overlaid on top of item text so that the text underneath is visible, or alternatively, markers may be displayed as a background fill with text displayed on top of the background fill. Root directory 605 has a level marker furthest to the left indicating that this is the highest level with the hierarchy. Parent directories 610 and 630 have level markers slightly offset to the right from the offset marker used with root directory 605. This change in offset indicates that the parent directories are in the next level of the hierarchy underneath the root directory. Child directory 615 has a level marker further to the right from the parent directories, indicating that the child directory is in the next, or third, level of the hierarchy. Finally, grandchild directories 620 and 625 have offset markers indicating that they are in the last, or fourth, level of the hierarchy shown. Their vertical placement underneath child directory 615 indicates that the grandchild directories shown are underneath the child directory in the hierarchy.

In this example, a single expansion is shown so that when the user selects parent B directory 630 using selection arrow 601, any directories in the next layer of the hierarchy underneath the Parent B directory are displayed. In this case, child directory 635 is displayed in resulting window 602. Child directory 635 has a similar offset marker as that shown for child directory 615 indicating that these directories are in the same level of the hierarchy. When child directory 635 is subsequently selected using selection arrow 636, any subdirectories in the next layer underneath child directory 635 are displayed. In this case, resulting window 603 shows grandchild directories 640 and 645 with offset markers similar to those shown for grandchild directories 620 and 625 indicating that all grandchild directories are in the same level of the hierarchy. While the same shading is used for the offset markers, the markers and/or the underlying text can be colored or use different grayscales to further indicate the level and hierarchical relationships between items. Also, while a single-level expansion is shown in FIG. 6a, a multi-level or other type of expansion could be used to display a all additional levels or a fixed number of levels when an item is selected by the user. Furthermore, emphasis of a particular item within the tree view control can be added using the techniques described in FIG. 4.

Figure 6B:
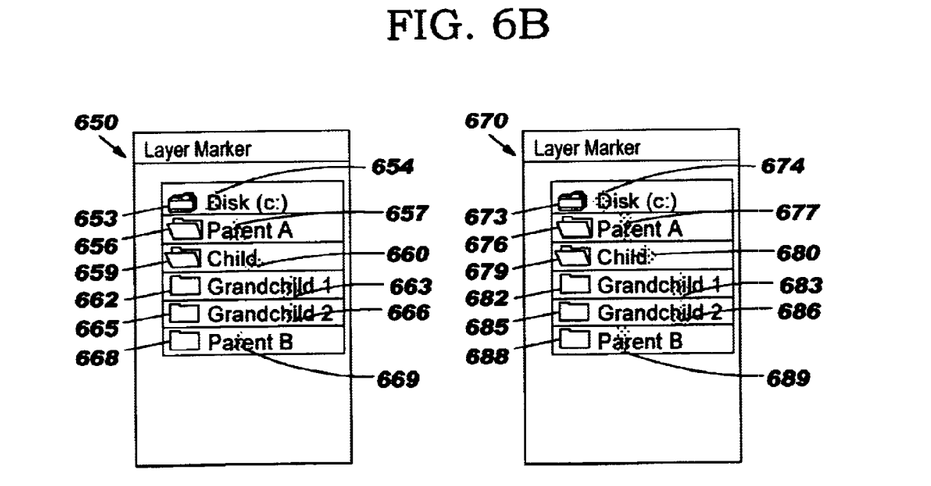
FIG. 6b shows two flat tree view controls using various shaped layer markers superimposed on tree view item to identify the hierarchical structure.

FIG. 6b shows two flat tree view controls using various shaped layer markers superimposed on tree view item to identify the hierarchical structure. In the example shown in FIG. 6a, an edge of the rectangular layer marker is used to determine the level of the directory within the hierarchy. However, other shapes may readily be used to indicate the various levels of data. For example, window 650 shows upwardly-pointing triangular markers used to denote an items position within the data hierarchy. The highest level item, root directory 653 is shown with triangular marker 654 indicating its uppermost position within the hierarchy. Parent A directory 656 and Parent B directory 668 are shown with triangular markers 657 and 669, respectively. As the next level in the hierarchy, markers 657 and 669 are shown slightly indented from uppermost triangular marker 654. A third level of the hierarchy, illustrated by Child directory 659, has triangular marker 660 slightly more indented than the second level markers (657 and 669). Finally, the lowest level directories, Grandchild directory 1 (662) and Grandchild directory 2 (665) have the most indented corresponding triangular markers (markers 663 and 666, respectively). In window 650 and 670, point of the marker, such as a center-point, may be used to note the level of data items with regard to other data items.

Furthermore, various shaped markers may be used to indicate a data item's level within the hierarchy. Window 670 illustrates the use of various shapes and indentations to indicate the level of the corresponding data. In window 670, diamond-shaped markers correspond to the first level of data, rectangular-shaped markers correspond to the second level of data, circular-shaped markers correspond to the third level of data, and triangular-shaped markers correspond to the fourth level of data. Root directory 673 has diamond-shaped marker 674 in a left-most indented position indicating that the root directory is a member of the first level of data. Parent A directory 676 and Parent B directory 688 are shown with rectangular markers 677 and 689, respectively, indicating that these directories are members of the second level of data. In addition, markers 677 and 689 are shown slightly indented from uppermost diamond-shaped marker 674. A third level of the hierarchy, illustrated by Child directory 679, has circular-shaped marker 680 slightly more indented than the second level rectangular-shaped markers (677 and 689). Finally, the lowest level directories, Grandchild directory 1 (682) and Grandchild directory 2 (685) have triangular markers (markers 683 and 686, respectively) that are the most indented markers in window 670, indicating that these directories are members of the lowest level of data.

In window 650 and 670, marker position, such as a center-point, as well as marker shape are used to note the level of data items with regard to other data items. In addition, the use of different marker shapes in window 670 can be used with or without marker indentation to note the relative level of data items within the hierarchy.

Figure 7:
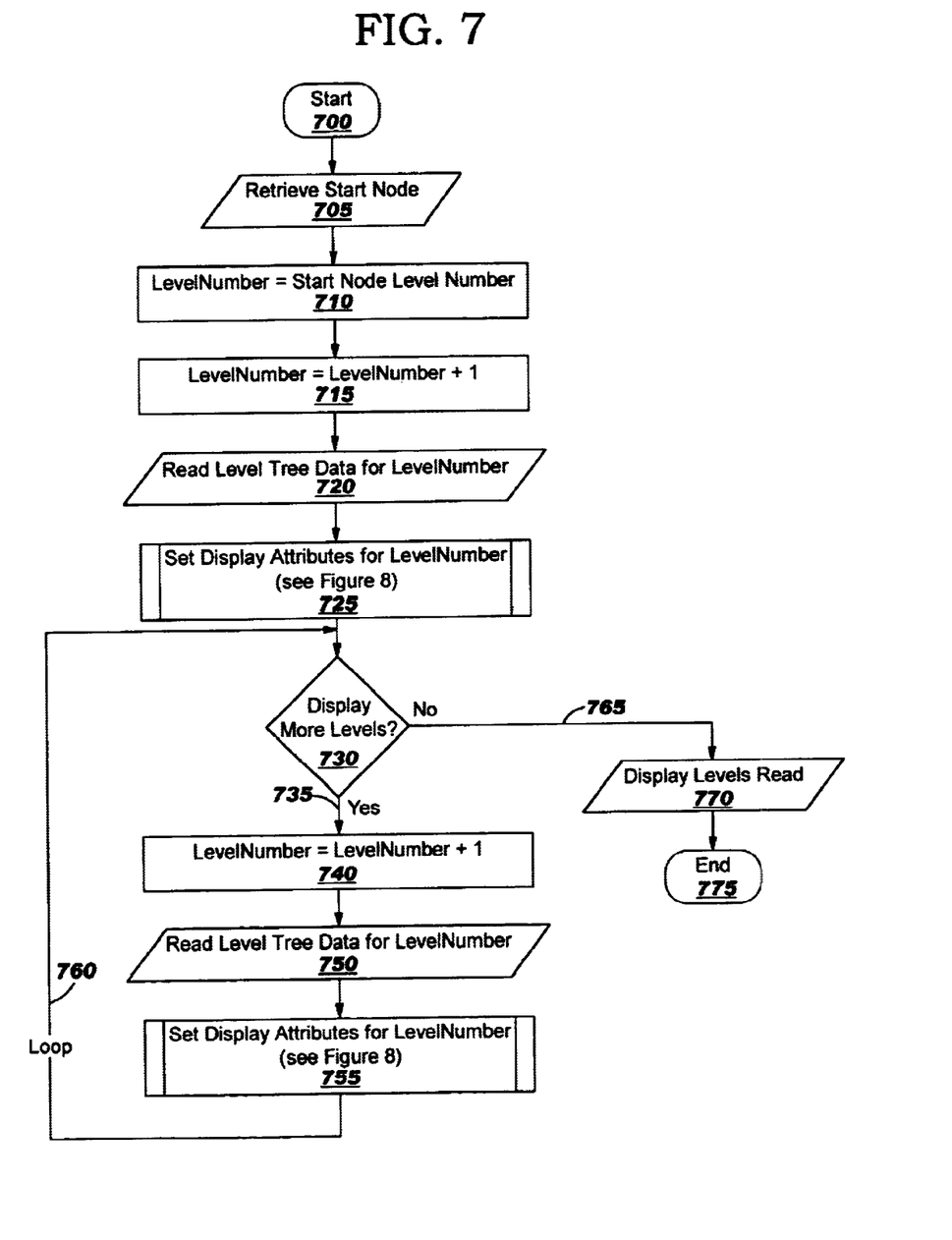
FIG. 7 is a high level flowchart showing item data being retrieved and displayed in a flat tree view control.

FIG. 7 is a high level flowchart showing item data being retrieved and displayed in a flat tree view control. Processing commences at 700 whereupon a starting point for the tree view is received (input 705). A level number is assigned to the starting node (step 710). When a tree view is initially started, the level number would be initialized to 0, however if the retrieved node is received as a selection from a currently displayed tree view, then the start node level would be determined by the node level of the selected item. The level number is incremented (step 715) and additional tree data is read for the level number (input 720). The tree data may be read from a directory table (i.e., a file allocation table), or a data file corresponding to a hierarchical set of information. The display attributes, such as shading, coloring, offset bars and markers, and numeric level indicators are included (predefined process 725, see FIG. 8 for further processing details). A determination is made as to whether additional levels of data need to be processed (decision 730). If additional levels of data need to be processed, decision 730 branches to "yes" branch 735 whereupon the level number is incremented (step 740), data for the next level is read (input 750), and display attributes are included (predefined process 725, see FIG. 8 for further processing details) before looping (loop 760) back to decision 730. This looping continues until no more levels need to be displayed, at which time decision 730 branches to "no" branch 765 and the levels read and processed are displayed to the user (output 770) before processing ends at 775.

Figure 8:
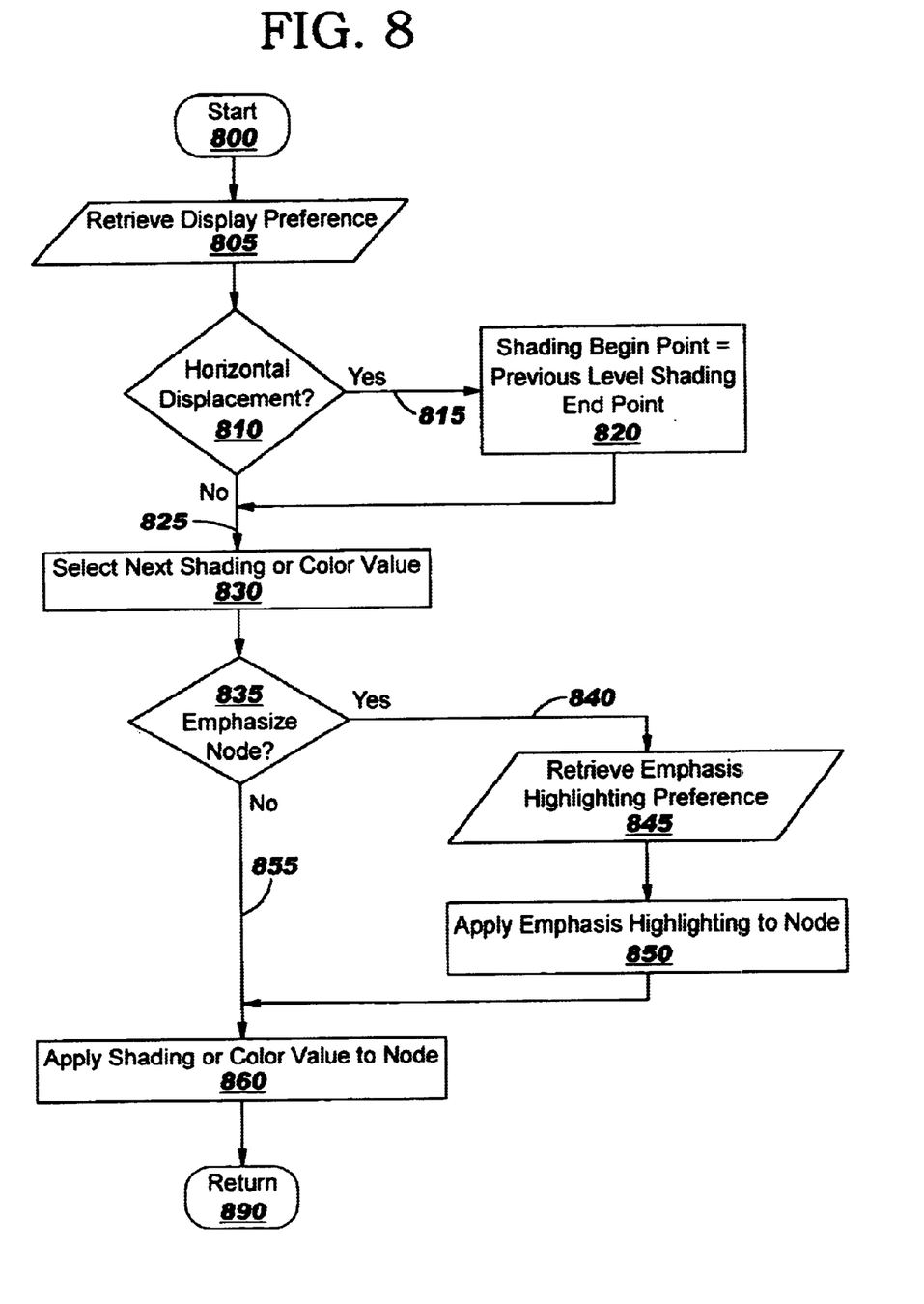
FIG. 8 is a lower level flowchart showing shading and emphasis values being applied to a tree view control node.

FIG. 8 is a lower level flowchart showing shading and emphasis values being applied to a tree view control node. Processing commences at 800 whereupon display parameters, or preferences, are retrieved (input 805). For example, display parameters or preferences may indicate whether color or grayscale will be used to indicate levels of data, whether items are emphasized, whether offset bars or markers are included, and whether numeric level indicators will be used. A determination is made as to whether a horizontal displacement, such as with an offset bar or marker, is included (decision 810). If horizontal displacement is included, decision 810 branches to "yes" branch 815 whereupon a shading begin point is determined based on the end point of the previous level shading coordinate (step 820). If this is the first layer in the hierarchy, then the shading begins at the left most coordinate used for shading. If a horizontal displacement is not needed, "no" branch 825 is taken bypassing the horizontal shading calculation. The next shading color or grayscale value is determined (step 830) based on the shading or color value used in the previous level. If only horizontal offset bars or marks is being used, the color or grayscale of all items may be the same. A determination is made as to whether the particular item is emphasized (decision 835). If the item is emphasized, decision 835 branches to "yes" branch 840 whereupon the emphasis highlighting preference is retrieved (input 845). This may include bolding or adding red color to important items, adding yellow highlighting to an error, etc. The retrieved emphasis is applied to the item (step 850). If no emphasis is being applied to the item, decision 835 branches to "no" branch 855 bypassing the emphasis steps. The shading or color, including any offset bars or markers, is applied to the item (step 860) so that the item's position within the hierarchy is visually indicated. Processing ends at return 890 which transfers control back to the calling routine (see FIG. 7).

Figure 9:
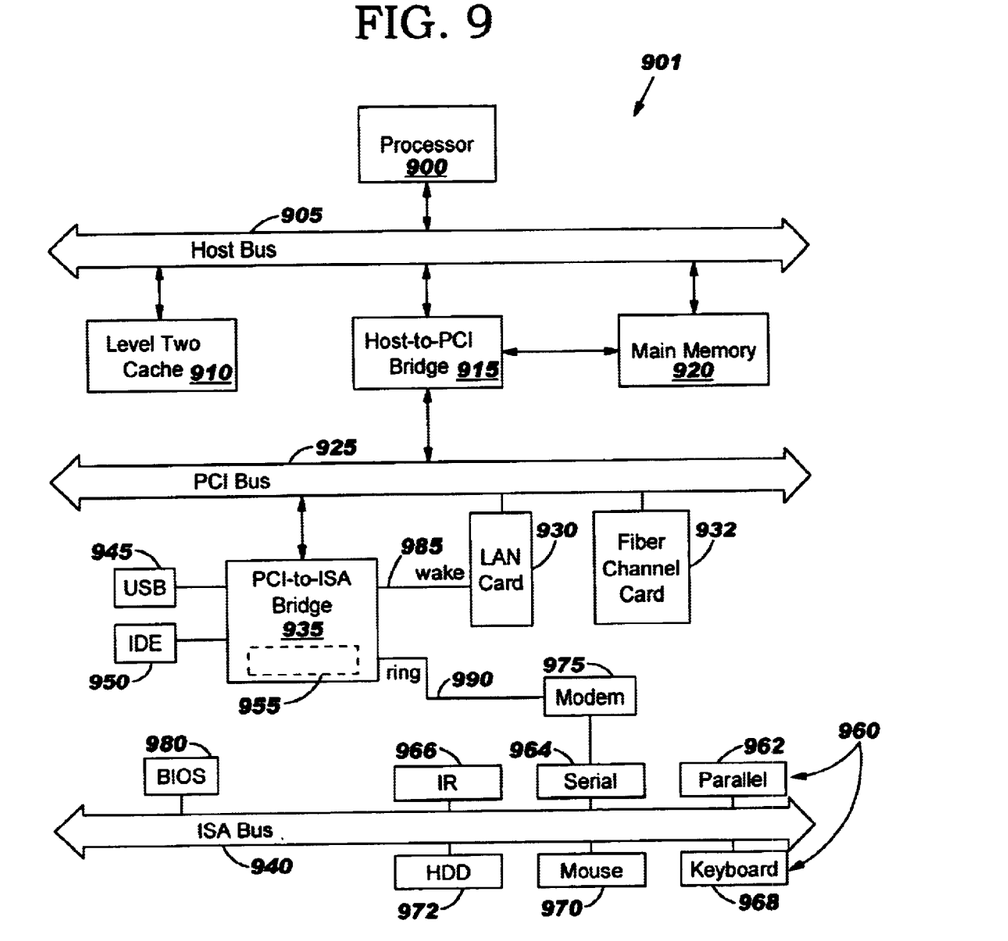
FIG. 9 is a block diagram of an information handling system capable of implementing the present invention.

FIG. 9 illustrates information handling system 901 which is a simplified example of a computer system capable of performing the server and client operations described herein. Computer system 901 includes processor 900 which is coupled to host bus 905. A level two (L2) cache memory 910 is also coupled to the host bus 905. Host-to-PCI bridge 915 is coupled to main memory 920, includes cache memory and main memory control functions, and provides bus control to handle transfers among PCI bus 925, processor 900, L2 cache 910, main memory 920, and host bus 905. PCI bus 925 provides an interface for a variety of devices including, for example, LAN card 930. PCI-to-ISA bridge 935 provides bus control to handle transfers between PCI bus 925 and ISA bus 940, universal serial bus (USB) functionality 945, IDE device functionality 950, power management functionality 955, and can include other functional elements not shown, such as a real-time clock (RTC), DMA control, interrupt support, and system management bus support. Peripheral devices and input/output (I/O) devices can be attached to various interfaces 960 (e.g., parallel interface 962, serial interface 964, infrared (IR) interface 966, keyboard interface 968, mouse interface 970, and fixed disk (HDD) 972) coupled to ISA bus 940. Alternatively, many I/O devices can be accommodated by a super I/O controller (not shown) attached to ISA bus 940.

BIOS 980 is coupled to ISA bus 940, and incorporates the necessary processor executable code for a variety of low-level system functions and system boot functions. BIOS 980 can be stored in any computer readable medium, including magnetic storage media, optical storage media, flash memory, random access memory, read only memory, and communications media conveying signals encoding the instructions (e.g., signals from a network). In order to attach computer system 901 to another computer system to copy files over a network, LAN card 930 is coupled to PCI bus 925 and to PCI-to-ISA bridge 935. Similarly, to connect computer system 901 to an ISP to connect to the Internet using a telephone line connection, modem 975 is connected to serial port 964 and PCI-to-ISA Bridge 935.

While the computer system described in FIG. 9 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of displaying layered data, said method comprising:
    identifying a plurality of item identifiers to be displayed in a display window;
    displaying the plurality of item identifiers using a plurality of vertically displaced identifier spaces, wherein each item identifier begins at a common margin within its respective identifier space;
    determining a layer level from a plurality of layer levels for each of the item identifiers; and
    overlaying a visual marker corresponding to the determined layer level in each identifier space.

2. The method as described in claim 1 wherein the visual marker includes a visual discontinuity with respect to the identifier space.

3. The method as described in claim 2 wherein the visual discontinuity includes a horizontal displacement of at least one edge of the visual marker.

4. The method as described in claim 1 further comprising:
    selecting a geometric shape from a plurality of geometric shapes corresponding to the plurality of layer levels, wherein the selected geometric shape corresponds to the determined layer level; and
    displaying the selected geometric shape in the identifier space corresponding to the item identifier.

5. The method as described in claim 4 wherein the displayed geometric shape is horizontally displaced within the identifier space, wherein the horizontal displacement is a function of the determined layer level.

6. The method as described in claim 1 further comprising:
analyzing an attribute corresponding to each item identifier;
determining a visual highlight corresponding to the attribute; and
displaying the visual highlight in the identifier space that includes the item identifier.

7. The method as described in claim 1 further comprising:
formatting the visual marker using one of a plurality of shadings, wherein each of the plurality of shadings corresponds to one of the plurality of layer levels.

8. An information handling system comprising:
one or more processors;
a memory accessible by the processors;
a display screen accessible by the processors; and
a layered data display tool to display layered data on the display screen, the layered data display tool including:
logic for identifying a plurality of item identifiers to be displayed in a display window;
display control logic for displaying the plurality of item identifiers using a plurality of vertically displaced identifier spaces, wherein each item identifier begins at a common margin within its respective identifier space;
level control logic for determining a layer level from a plurality of layer levels for each of the item identifiers; and
visual marker logic for overlaying a visual marker corresponding to the determined layer level in each identifier space.

9. The information handling system as described in claim 8 wherein the visual marker logic includes logic for creating a visual discontinuity with respect to the identifier space.

10. The information handling system as described in claim 9 wherein the visual discontinuity includes a horizontal displacement of at least one edge of the visual marker.

11. The information handling system as described in claim 8 further comprising:
selection logic for selecting a geometric shape from a plurality of geometric shapes corresponding to the plurality of layer levels, wherein the selected geometric shape corresponds to the determined layer level; and
geometric shape placement logic for displaying the selected geometric shape in the identifier space corresponding to the item identifier.

12. The information handling system as described in claim 11 wherein the displayed geometric shape is horizontally displaced within the identifier space, wherein the horizontal displacement is a function of the layer level.

13. The information handling system as described in claim 8 further comprising:
marker highlighting logic for formatting the visual marker using one of a plurality of shadings, wherein each of the plurality of shadings corresponds to one of the plurality of layer levels.

14. A computer program product stored on a computer operable media for displaying layered data, said computer program product comprising:
means for identifying a plurality of item identifiers to be displayed in a display window;
means for displaying the plurality of item identifiers using a plurality of vertically displaced identifier spaces, wherein each item identifier begins at a common margin within its respective identifier space;
means for determining a layer level from a plurality of layer levels for each of the item identifiers; and
means for overlaying a visual marker corresponding to the determined layer level in each identifier space.

15. The computer program product as described in claim 14 wherein the visual marker includes a visual discontinuity with respect to the identifier space, and wherein the visual discontinuity includes a horizontal displacement of at least one edge of the visual marker.

16. The computer program product as described in claim 14 further comprising:
means for selecting a geometric shape from a plurality of geometric shapes corresponding to the plurality of layer levels, wherein the selected geometric shape corresponds to the determined layer level; and
means for displaying the selected geometric shape in the identifier space corresponding to the item identifier.

17. The computer program product as described in claim 14 further comprising:
means for analyzing an attribute corresponding to each item identifier;
means for determining a visual highlight corresponding to the attribute; and
means for displaying the visual highlight in the identifier space that includes the item identifier.

18. The computer program product as described in claim 14 further comprising:
formatting the visual marker using one of a plurality of shadings, wherein each of the plurality of shadings corresponds to one of the plurality of layer levels.

* * * * *